US009503992B2

(12) United States Patent
Brown et al.

(10) Patent No.: US 9,503,992 B2
(45) Date of Patent: Nov. 22, 2016

(54) DETERMINING A TARGET TRANSMIT POWER OF A WIRELESS TRANSMISSION

(75) Inventors: Michael K. Brown, Fergus (CA); Scott Totzke, Waterloo (CA); Herb Little, Waterloo (CA); Neil Adams, Waterloo (CA); Michael S. Brown, Waterloo (CA)

(73) Assignee: BlackBerry Limited, Waterloo (CA)

(*) Notice: Subject to any disclaimer, the term of this patent is extended or adjusted under 35 U.S.C. 154(b) by 676 days.

(21) Appl. No.: 12/352,315

(22) Filed: Jan. 12, 2009

(65) Prior Publication Data
US 2009/0111504 A1 Apr. 30, 2009

Related U.S. Application Data

(63) Continuation of application No. 11/097,145, filed on Apr. 4, 2005, now Pat. No. 7,477,913.

(51) Int. Cl.
*H04W 52/28* (2009.01)
*H04L 29/06* (2006.01)

(52) U.S. Cl.
CPC ........... *H04W 52/281* (2013.01); *H04L 63/20* (2013.01)

(58) Field of Classification Search
CPC ............................. H04W 52/281; H04L 63/20
USPC ........................................................ 455/522
See application file for complete search history.

(56) References Cited

U.S. PATENT DOCUMENTS 5,070,329 A * 12/1991 Jasinaki ................ 340/7.27
5,146,499 A * 9/1992 Geffrotin ............. G06F 21/34
235/380
5,206,909 A * 4/1993 Gates ..................... 380/59
5,225,902 A * 7/1993 McMullan, Jr. ...... H04H 20/42
348/E7.049
5,596,313 A * 1/1997 Berglund et al. ............ 340/574
5,623,531 A * 4/1997 Nilssen ................... H04B 3/54
379/324
5,640,002 A * 6/1997 Ruppert et al. ......... 235/462.46
5,661,802 A * 8/1997 Nilssen ................... H04B 3/54
380/231

(Continued)

FOREIGN PATENT DOCUMENTS

GB 2282734 4/1995

OTHER PUBLICATIONS

Barlow, Gareth , "Bluetooth security, Network and Inter-network Security report", Cape Town, South Africa (see www.cs.uct.ac.za/courses/CS400W/NIS04/papers2001/gareth_barlow.html) Apr. 20, 2001.

(Continued)

*Primary Examiner* — Hai V Nguyen
(74) *Attorney, Agent, or Firm* — Integral IP; Miriam Paton; Amy Scouten

(57) ABSTRACT

Different target transmit powers are determined for different wireless transmissions from a wireless device. The target transmit power of a wireless transmission may depend upon whether any transmitters other than the device to which the wireless transmission is to be sent are within range of the sending wireless device. The target transmit power of a wireless transmission may be based, at least in part, on a current location of a device to which one or more frames carried by the wireless transmission are addressed. The target transmit power of a wireless transmission may be based, at least in part, on confidentiality of data carried by the wireless transmission.

9 Claims, 3 Drawing Sheets

(56) References Cited

U.S. PATENT DOCUMENTS

| | | | | |
|---|---|---|---|---|
| 5,850,180 A * | 12/1998 | Hess | | 340/541 |
| 5,999,094 A * | 12/1999 | Nilssen | | H04B 3/54 340/507 |
| 6,073,003 A * | 6/2000 | Nilssen | | H04B 3/54 455/402 |
| 6,148,205 A * | 11/2000 | Cotton | | H04L 63/0492 455/418 |
| 6,163,259 A * | 12/2000 | Barsumian et al. | | 340/572.2 |
| 6,167,278 A * | 12/2000 | Nilssen | | H04B 3/54 455/462 |
| 6,222,440 B1 * | 4/2001 | Heller | | G06K 7/0008 340/10.3 |
| 6,294,992 B1 * | 9/2001 | Addy et al. | | G08B 25/10 340/514 |
| 6,369,693 B1 * | 4/2002 | Gibson | | 340/5.8 |
| 6,522,888 B1 * | 2/2003 | Garceran et al. | | H04W 16/18 455/423 |
| 6,526,039 B1 * | 2/2003 | Dahlman et al. | | 370/350 |
| 6,564,997 B1 | 5/2003 | Juds | | |
| 6,571,103 B1 | 5/2003 | Novakov | | |
| 6,590,682 B1 * | 7/2003 | Hamilton | | H04B 10/1143 398/121 |
| 6,607,125 B1 * | 8/2003 | Clouser | | G06K 7/10851 235/383 |
| 6,697,638 B1 * | 2/2004 | Larsson | | H04M 1/6091 455/11.1 |
| 6,714,778 B2 * | 3/2004 | Nykanen | | H04L 63/10 455/410 |
| 6,738,485 B1 * | 5/2004 | Boesen | | H04M 1/6066 181/130 |
| 6,741,841 B1 * | 5/2004 | Mitchell | | 455/188.1 |
| 6,763,226 B1 * | 7/2004 | McZeal, Jr. | | 455/90.2 |
| 6,772,331 B1 * | 8/2004 | Hind | | G06F 21/445 370/313 |
| 6,795,688 B1 | 9/2004 | Plasson et al. | | |
| 6,801,777 B2 * | 10/2004 | Rusch | | H04W 48/18 455/450 |
| 6,871,078 B2 * | 3/2005 | Nishioka et al. | | 455/522 |
| 6,928,295 B2 * | 8/2005 | Olson | | H04L 63/0492 455/41.2 |
| 6,961,541 B2 * | 11/2005 | Overy et al. | | 455/41.2 |
| 6,968,153 B1 * | 11/2005 | Heinonen et al. | | 455/11.1 |
| 6,990,428 B1 * | 1/2006 | Kaiser et al. | | 702/150 |
| 6,996,423 B2 * | 2/2006 | Kitajima | | H04M 1/2745 455/412.1 |
| 7,006,446 B1 * | 2/2006 | Anderson | | 370/248 |
| 7,039,392 B2 * | 5/2006 | McCorkle et al. | | 455/411 |
| 7,046,977 B2 * | 5/2006 | Khlat et al. | | 455/260 |
| 7,058,018 B1 * | 6/2006 | Hasty et al. | | 370/250 |
| 7,084,756 B2 * | 8/2006 | Stilp | | 340/539.1 |
| 7,085,588 B1 * | 8/2006 | Pfister | | H04L 41/12 455/446 |
| 7,088,960 B2 * | 8/2006 | Kato | | H04W 36/06 455/115.3 |
| 7,092,713 B2 * | 8/2006 | Raji | | 455/445 |
| 7,123,840 B2 * | 10/2006 | Hamilton | | H04B 10/1143 398/118 |
| 7,136,655 B2 * | 11/2006 | Skafidas et al. | | 455/450 |
| 7,158,814 B2 * | 1/2007 | Ozluturk | | H04B 7/026 455/445 |
| 7,174,130 B2 * | 2/2007 | Kurisko et al. | | 455/41.2 |
| 7,190,948 B2 * | 3/2007 | Donley et al. | | 455/411 |
| 7,193,644 B2 * | 3/2007 | Carter | | H04N 7/147 348/14.06 |
| 7,195,173 B2 * | 3/2007 | Powell et al. | | 235/492 |
| 7,212,122 B2 * | 5/2007 | Gloekler et al. | | 340/572.1 |
| 7,212,828 B2 * | 5/2007 | Hind et al | | 455/456.1 |
| 7,218,682 B2 * | 5/2007 | Mayor | | H04B 1/7115 375/267 |
| 7,228,138 B2 * | 6/2007 | Hansson et al. | | 455/456.1 |
| 7,228,142 B2 * | 6/2007 | Natori et al. | | 455/456.3 |
| 7,245,947 B2 * | 7/2007 | Salokannel et al. | | 455/574 |
| 7,249,266 B2 * | 7/2007 | Margalit | | G06F 21/34 713/189 |
| 7,251,457 B1 * | 7/2007 | Davi | | 455/67.13 |
| 7,254,367 B2 * | 8/2007 | Helden et al. | | 455/41.2 |
| 7,260,362 B2 * | 8/2007 | Teibel | | H04W 36/16 455/115.3 |
| 7,263,331 B2 * | 8/2007 | Gupta et al. | | 455/41.2 |
| 7,269,198 B1 * | 9/2007 | Elliott et al. | | 375/130 |
| 7,277,547 B1 * | 10/2007 | Delker et al. | | 380/270 |
| 7,278,084 B2 * | 10/2007 | Palin et al. | | 714/758 |
| 7,286,833 B2 * | 10/2007 | Friday et al. | | 455/456.1 |
| 7,289,790 B2 * | 10/2007 | McCorkle et al. | | 455/411 |
| 7,290,715 B2 * | 11/2007 | Sellen et al. | | 235/492 |
| 7,293,088 B2 * | 11/2007 | Douglas | | G01S 5/0252 455/404.2 |
| 7,295,119 B2 * | 11/2007 | Rappaport et al. | | 340/572.4 |
| 7,298,840 B2 * | 11/2007 | Gehrmann et al. | | 380/36 |
| 7,299,364 B2 * | 11/2007 | Noble | | G06F 21/6227 340/5.6 |
| 7,305,478 B2 * | 12/2007 | Willins et al. | | 709/229 |
| 7,313,421 B2 * | 12/2007 | Dejanovic et al. | | 455/574 |
| 7,340,247 B1 * | 3/2008 | O'Hara et al. | | 455/418 |
| 7,346,364 B1 * | 3/2008 | Tsien et al. | | 455/522 |
| 7,349,871 B2 | 3/2008 | Labrou et al. | | |
| 7,349,963 B2 * | 3/2008 | Rhee | | H04L 12/24 709/224 |
| 7,352,972 B2 * | 4/2008 | Franklin | | H04B 10/1141 398/127 |
| 7,352,996 B2 * | 4/2008 | Kumar | | G06F 21/35 340/5.1 |
| 7,352,998 B2 * | 4/2008 | Palin et al. | | 455/41.2 |
| 7,359,363 B2 * | 4/2008 | Sakai | | 370/338 |
| 7,366,537 B2 | 4/2008 | Backes et al. | | |
| 7,409,214 B2 * | 8/2008 | Lee | | 455/436 |
| 7,423,535 B2 * | 9/2008 | Chung | | G08B 19/00 340/10.4 |
| 7,430,181 B1 * | 9/2008 | Hong | | 370/254 |
| 7,433,321 B2 * | 10/2008 | Grilli et al. | | 370/252 |
| 7,450,974 B2 * | 11/2008 | Bennett et al. | | 455/574 |
| 7,463,886 B2 * | 12/2008 | Salokannel et al. | | 455/426.1 |
| 7,477,913 B2 * | 1/2009 | Brown | | H04W 52/281 380/270 |
| 7,480,324 B2 * | 1/2009 | Aiello et al. | | 375/130 |
| 7,489,902 B2 * | 2/2009 | Amani et al. | | 455/63.1 |
| 7,495,551 B2 * | 2/2009 | Waxman | | H04W 12/10 340/539.1 |
| 7,497,384 B2 * | 3/2009 | Powell et al. | | 235/492 |
| 7,499,674 B2 * | 3/2009 | Salokannel et al. | | 455/69 |
| 7,546,639 B2 * | 6/2009 | Bantz et al. | | 726/27 |
| 7,599,691 B1 * | 10/2009 | Mitchell | | 455/431 |
| 7,606,573 B1 * | 10/2009 | Vacon et al. | | 455/446 |
| 7,609,670 B2 * | 10/2009 | Strutt et al. | | 370/328 |
| 7,636,338 B1 * | 12/2009 | Vu et al. | | 370/338 |
| 7,660,576 B2 * | 2/2010 | Kitajima et al. | | 455/412.1 |
| 7,668,556 B2 * | 2/2010 | Yokoshi et al. | | 455/456.3 |
| 7,672,246 B2 * | 3/2010 | Hasty et al. | | 370/250 |
| 7,674,298 B1 * | 3/2010 | Cambridge | | 726/35 |
| 7,676,216 B2 * | 3/2010 | Stieglitz et al. | | 455/410 |
| 7,692,532 B2 * | 4/2010 | Fischer et al. | | 340/10.2 |
| 7,697,893 B2 * | 4/2010 | Kossi et al. | | 455/41.2 |
| 7,716,585 B2 * | 5/2010 | Glass | | 715/734 |
| 7,738,569 B2 * | 6/2010 | Quinn et al. | | 375/259 |
| 7,739,503 B2 * | 6/2010 | Sato et al. | | 713/169 |
| 7,742,602 B2 * | 6/2010 | Ishidoshiro et al. | | 380/270 |
| 7,834,743 B2 * | 11/2010 | Nagata et al. | | 340/10.4 |
| 7,876,735 B2 * | 1/2011 | Krantz et al. | | 370/338 |
| 7,890,131 B2 * | 2/2011 | Backes et al. | | 455/522 |
| 7,913,297 B2 * | 3/2011 | Wyld | | H04L 63/08 726/5 |
| 7,958,351 B2 * | 6/2011 | Luthi | | G06F 21/6218 380/264 |
| 7,961,705 B2 * | 6/2011 | Kennedy | | H04B 1/7163 370/349 |
| 8,019,352 B2 * | 9/2011 | Rappaport | | G01S 5/0252 340/988 |
| 8,077,079 B2 * | 12/2011 | Kaiser et al. | | 342/174 |
| 8,130,958 B2 * | 3/2012 | Schrum, Jr. | | H04L 63/0428 370/310 |

(56) References Cited

U.S. PATENT DOCUMENTS

| | | | | |
|---|---|---|---|---|
| 8,316,237 | B1* | 11/2012 | Felsher | H04L 9/0825 380/282 |
| 8,358,613 | B1* | 1/2013 | Giallorenzi | H04W 12/02 370/328 |
| 8,934,385 | B2* | 1/2015 | Yamaguchi | H04W 52/50 370/278 |
| 2001/0011023 | A1* | 8/2001 | Nishioka et al. | 455/522 |
| 2001/0041591 | A1* | 11/2001 | Carroll | 455/557 |
| 2001/0051530 | A1* | 12/2001 | Shiotsu et al. | 455/522 |
| 2002/0003481 | A1* | 1/2002 | Kantola et al. | 340/825.77 |
| 2002/0063653 | A1* | 5/2002 | Oey et al. | 342/29 |
| 2002/0075844 | A1* | 6/2002 | Hagen | 370/351 |
| 2002/0115426 | A1 | 8/2002 | Olson et al. | |
| 2002/0123325 | A1* | 9/2002 | Cooper | 455/411 |
| 2002/0172294 | A1* | 11/2002 | Cheng | 375/281 |
| 2002/0194003 | A1* | 12/2002 | Mozer | G06F 21/32 704/270.1 |
| 2003/0050009 | A1* | 3/2003 | Kurisko et al. | 455/41 |
| 2003/0060168 | A1* | 3/2003 | Teibel | H04W 36/16 455/69 |
| 2003/0060206 | A1* | 3/2003 | Sointula et al. | 455/450 |
| 2003/0119523 | A1* | 6/2003 | Bulthuis | 455/456 |
| 2003/0128988 | A1* | 7/2003 | Hamilton | H04B 10/1143 398/120 |
| 2003/0142800 | A1* | 7/2003 | Paschal | G07C 13/00 379/92.02 |
| 2003/0183691 | A1 | 10/2003 | Lahteenmaki et al. | |
| 2003/0184430 | A1* | 10/2003 | Kumar | 340/5.2 |
| 2003/0189906 | A1* | 10/2003 | Belcea | 370/318 |
| 2003/0203742 | A1* | 10/2003 | D'Souza et al. | 455/522 |
| 2004/0005898 | A1* | 1/2004 | Kato | H04W 36/06 455/450 |
| 2004/0044902 | A1* | 3/2004 | Luthi | G06F 21/6218 726/15 |
| 2004/0098350 | A1 | 5/2004 | Labrou et al. | |
| 2004/0101037 | A1* | 5/2004 | Meng | 375/220 |
| 2004/0107170 | A1 | 6/2004 | Labrou et al. | |
| 2004/0134984 | A1* | 7/2004 | Powell et al. | 235/451 |
| 2004/0201277 | A1* | 10/2004 | Hentsch et al. | 307/10.1 |
| 2004/0203362 | A1* | 10/2004 | Pattabiraman et al. | 455/41.2 |
| 2004/0203564 | A1* | 10/2004 | Ho et al. | 455/404.1 |
| 2004/0229621 | A1* | 11/2004 | Misra | 455/445 |
| 2004/0230887 | A1* | 11/2004 | Sellen et al. | 715/500.1 |
| 2004/0236547 | A1* | 11/2004 | Rappaport | G06F 17/509 703/2 |
| 2004/0259558 | A1* | 12/2004 | Skafidas et al. | 455/450 |
| 2004/0259563 | A1* | 12/2004 | Morton et al. | 455/452.2 |
| 2005/0009563 | A1* | 1/2005 | Stenmark | 455/558 |
| 2005/0027543 | A1 | 2/2005 | Labrou et al. | |
| 2005/0030384 | A1* | 2/2005 | Lee et al. | 348/207.99 |
| 2005/0031045 | A1* | 2/2005 | Mayor | H04B 1/7115 375/260 |
| 2005/0042996 | A1* | 2/2005 | Khlat et al. | 455/255 |
| 2005/0055579 | A1* | 3/2005 | Kanda | H04L 63/20 726/4 |
| 2005/0059388 | A1 | 3/2005 | Haines et al. | |
| 2005/0066000 | A1* | 3/2005 | Liaw et al. | 709/204 |
| 2005/0073980 | A1* | 4/2005 | Thomson et al. | 370/338 |
| 2005/0097046 | A1* | 5/2005 | Singfield | 705/42 |
| 2005/0101340 | A1* | 5/2005 | Archiable | H04W 52/367 455/522 |
| 2005/0107134 | A1* | 5/2005 | Morioka et al. | 455/574 |
| 2005/0124390 | A1* | 6/2005 | Hansson et al. | 455/575.1 |
| 2005/0136964 | A1* | 6/2005 | Le Saint | G06F 21/31 455/522 |
| 2005/0138396 | A1* | 6/2005 | Freeman et al. | 713/188 |
| 2005/0143115 | A1* | 6/2005 | Hiddink et al. | 455/522 |
| 2005/0146418 | A1* | 7/2005 | Caren | 340/5.21 |
| 2005/0174563 | A1* | 8/2005 | Evans et al. | 356/73.1 |
| 2005/0184857 | A1* | 8/2005 | Roatis et al. | 340/5.73 |
| 2005/0193137 | A1 | 9/2005 | Farnham | |
| 2005/0197136 | A1* | 9/2005 | Friday et al. | 455/456.1 |
| 2005/0208952 | A1* | 9/2005 | Dietrich et al. | 455/456.1 |
| 2005/0232425 | A1* | 10/2005 | Hughes et al. | 380/270 |
| 2005/0237189 | A1* | 10/2005 | Tani | G05D 1/0246 340/541 |
| 2005/0261004 | A1* | 11/2005 | Dietrich et al. | 455/456.2 |
| 2005/0261037 | A1* | 11/2005 | Raghunath et al. | 455/574 |
| 2005/0265552 | A1 | 12/2005 | Olson et al. | |
| 2005/0275505 | A1* | 12/2005 | Himmelstein | G10L 17/22 340/5.8 |
| 2005/0281320 | A1* | 12/2005 | Neugebauer | 375/141 |
| 2005/0286465 | A1* | 12/2005 | Zhuang | 370/329 |
| 2005/0287950 | A1* | 12/2005 | Helden et al. | 455/41.2 |
| 2006/0019679 | A1* | 1/2006 | Rappaport et al. | 455/456.5 |
| 2006/0026304 | A1* | 2/2006 | Price | 710/8 |
| 2006/0050798 | A1* | 3/2006 | Odigie et al. | 375/259 |
| 2006/0052069 | A1* | 3/2006 | Odagiri et al. | 455/127.1 |
| 2006/0056636 | A1* | 3/2006 | Schrum | H04L 63/0428 380/273 |
| 2006/0058053 | A1* | 3/2006 | Jatschka | 455/522 |
| 2006/0058062 | A1* | 3/2006 | Bhagwat et al. | 455/553.1 |
| 2006/0065731 | A1* | 3/2006 | Powell et al. | 235/451 |
| 2006/0069526 | A1* | 3/2006 | Kaiser et al. | 702/150 |
| 2006/0070113 | A1* | 3/2006 | Bhagwat et al. | 726/2 |
| 2006/0072151 | A1* | 4/2006 | Amani et al. | 358/1.15 |
| 2006/0072530 | A1* | 4/2006 | Strutt et al. | 370/338 |
| 2006/0083378 | A1* | 4/2006 | Budde et al. | 380/277 |
| 2006/0087984 | A1* | 4/2006 | Kim et al. | 370/252 |
| 2006/0094400 | A1* | 5/2006 | Beachem et al. | 455/410 |
| 2006/0101116 | A1* | 5/2006 | Rittman et al. | 709/204 |
| 2006/0126545 | A1* | 6/2006 | Nanda | 370/310 |
| 2006/0133409 | A1* | 6/2006 | Prakash et al. | 370/450 |
| 2006/0159038 | A1* | 7/2006 | Hasty et al. | 370/315 |
| 2006/0179311 | A1* | 8/2006 | McCorkle et al. | 713/168 |
| 2006/0187865 | A1* | 8/2006 | Sakai | 370/311 |
| 2006/0193299 | A1* | 8/2006 | Winget et al. | 370/338 |
| 2006/0197682 | A1* | 9/2006 | Crocker et al. | 340/902 |
| 2006/0223566 | A1* | 10/2006 | Brown et al. | 455/522 |
| 2006/0236117 | A1 | 10/2006 | Lazaridis et al. | |
| 2006/0275040 | A1* | 12/2006 | Franklin | H04B 10/1141 398/172 |
| 2007/0001854 | A1* | 1/2007 | Chung et al. | 340/572.1 |
| 2007/0013519 | A1* | 1/2007 | Chung et al. | 340/572.1 |
| 2007/0032195 | A1* | 2/2007 | Kurisko et al. | 455/41.2 |
| 2007/0037554 | A1* | 2/2007 | Freeny, Jr. | 455/410 |
| 2007/0043729 | A1* | 2/2007 | Kevenaar | 707/10 |
| 2007/0069884 | A1* | 3/2007 | Waxman | H04W 12/10 340/539.1 |
| 2007/0115176 | A1* | 5/2007 | Zimmerman et al. | 342/465 |
| 2007/0140494 | A1 | 6/2007 | Kumoluyi et al. | |
| 2007/0146127 | A1 | 6/2007 | Stilp et al. | |
| 2007/0174152 | A1* | 7/2007 | Bjornberg et al. | 705/28 |
| 2007/0184864 | A1* | 8/2007 | Leitch et al. | 455/507 |
| 2007/0205877 | A1* | 9/2007 | Caren | 340/426.14 |
| 2007/0258472 | A1* | 11/2007 | Eklund | 370/401 |
| 2007/0265755 | A1* | 11/2007 | Heslin et al. | 701/49 |
| 2007/0268138 | A1* | 11/2007 | Chung et al. | 340/572.1 |
| 2007/0287473 | A1 | 12/2007 | Dupray | |
| 2008/0111686 | A1* | 5/2008 | Hall et al. | 340/552 |
| 2008/0212582 | A1* | 9/2008 | Zwart et al. | 370/390 |
| 2008/0214116 | A1* | 9/2008 | Leung Hang et al. | 455/67.11 |
| 2008/0227392 | A1* | 9/2008 | Van De Meulenhof et al. | 455/41.2 |
| 2009/0002176 | A1* | 1/2009 | Bekritstky | G06K 7/0008 340/572.7 |
| 2009/0046625 | A1* | 2/2009 | Diener et al. | 370/319 |
| 2009/0111504 | A1* | 4/2009 | Brown et al. | 455/522 |
| 2009/0170519 | A1* | 7/2009 | Wilhoite et al. | 455/436 |
| 2009/0213722 | A1* | 8/2009 | Backes et al. | 370/201 |
| 2009/0226176 | A1* | 9/2009 | Franklin | H04B 10/1141 398/115 |
| 2009/0240940 | A1* | 9/2009 | Shoemake et al. | 713/168 |
| 2010/0329247 | A1* | 12/2010 | Kennedy | H04B 1/7163 370/389 |

(56) References Cited

U.S. PATENT DOCUMENTS

2011/0006877 A1* 1/2011 Franklin ............ H04B 10/1141
340/3.9
2011/0280235 A1* 11/2011 Tiwari .......................... 370/338

OTHER PUBLICATIONS

Chassatte, Remy, Extended European Search Report for EP 05102637.5, Sep. 6, 2005.
Chassatte, Remy, Extended European Search Report for EP 07115487.6, May 6, 2008.
Chassatte, Remy, Extended European Search Report for EP 07115485.0, May 6, 2008.
Hayami, Jamie, First Office Action for CA 2,539,990, Mar. 11, 2010.

\* cited by examiner

DETERMINING A TARGET TRANSMIT POWER OF A WIRELESS TRANSMISSION

CROSS-REFERENCE TO RELATED APPLICATIONS

This application is a continuation of U.S. patent application Ser. No. 11/097,145 filed Apr. 4, 2005, entitled "DETERMINING A TARGET TRANSMIT POWER OF A WIRELESS TRANSMISSION ACCORDING TO SECURITY REQUIREMENTS", to be issued Jan. 13, 2009 as U.S. Pat. No. 7,477,913, which is incorporated by reference in its entirety.

BACKGROUND OF THE INVENTION

In general, wireless communication is insecure and vulnerable to attacks. Various techniques may be employed to secure a wireless communication link or to make it less vulnerable to attacks. For example, it is recommended to place a wireless access point away from external walls and to lower the transmit power of its antenna so that the signal strength is strong enough for use inside the building but weak outside of the building where it may be accessible by others.

Bluetooth® wireless technology provides short-range and low power wireless connectivity to eliminate the need for cables to connect computerized devices and their peripheral devices. A non-exhaustive list of examples of computerized devices includes personal computers (PCs), mobile phones, personal digital assistants (PDA), portable computers, pagers, handheld devices, and the like. A non-exhaustive list of examples of peripheral devices includes headsets, printers, keyboards, mice, and the like.

The Bluetooth® specifications were designed with various concepts in mind, including output power control that optimizes power according to device distance. According to the Bluetooth® specification version 1.2, there are three classes of transmitters, and power control is mandatory only for those transmitters in the class where the maximum output power is 100 mW (20 dBm) and the minimum output power at the maximum power setting is 1 mW. At page 33 of the Radio Specification section of the Bluetooth® specification version 1.2, it is stated "The power control (of a power class 1 device) is used for limiting the transmitted power over +4 dBm. Power control capability under +4 dBm is optional and could be used for optimizing the power consumption and overall interference level".

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 2 is a flowchart of a method to be implemented by one of the devices in FIG. 1, according to some embodiments of the invention; and.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
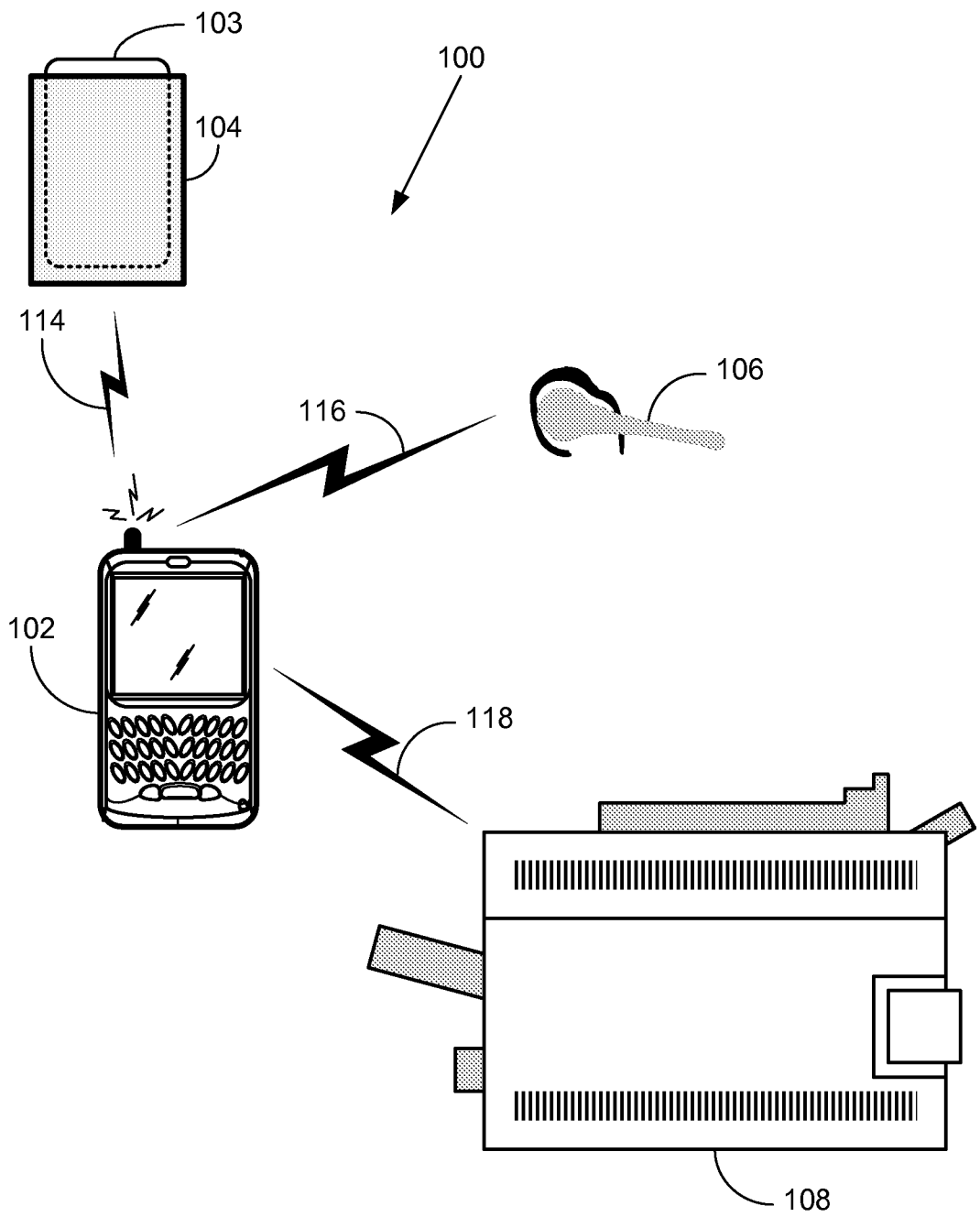
FIG. 1 is a schematic diagram of an exemplary system, according to some embodiments of the invention.

FIG. 1 is a schematic diagram of an exemplary system, according to some embodiments of the invention. A system 100 includes a mobile device 102 and one or more additional devices able to communicate with mobile device 102. For example, these other devices may include peripherals such as a wireless smart card reader 104, a wireless headset 106, and a wireless printer 108, which may be able to communicate with device 102 over wireless communication links 114, 116 and 118, respectively. A non-exhaustive list of examples of wireless local area network standards for wireless communication links 114, 116 and 118 includes the Institute of Electrical and Electronic Engineers (IEEE) for Wireless LAN MAC and Physical layer (PHY) 802.11 a, b, g and n specifications or future related standards, the Bluetooth® standard, the Zigbee™ standard and the like.

A smart card 103 is shown inserted into smart card reader 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 103 may use smart card reader 104 for identification and to digitally sign and/or decrypt messages sent by device 102.

For example, mobile device 102 may be able to send and receive e-mail messages via an e-mail server (not shown). If, for example, the Secure Multipurpose Internet Mail Extensions (S/MIME) protocol is used, e-mail messages received at mobile device 102 are encrypted using a symmetric algorithm with a random session key generated by the sender of the e-mail message. The e-mail message also includes the session key, encrypted using the public key of the recipient. Upon receipt of an encrypted e-mail message, mobile device 102 may extract the encrypted session key and send it to smart card reader 104 via communication link 114. Smart card reader 104 may send the encrypted session key to smart card 103, and the decryption engine of smart card 103 may decrypt the encrypted session key using the recipient's private decryption key, which is stored in smart card 103. Smart card reader 104 may retrieve the decrypted session key from smart card 103 and forward it to mobile device 102 via communication link 114 so that mobile device 102 can decrypt the received e-mail message. The smart card 103 may prevent unauthorized use of the recipient's private decryption key by requiring that a password or personal identification number (PIN) be supplied before allowing the decryption operation to proceed.

Similarly, to add a digital signature to an e-mail message being sent by mobile device 102, mobile device 102 may send a hash of the contents of the e-mail message to smart card reader 104 over communication link 114. Smart card reader 104 may pass the hash to smart card 103, which may produce a digital signature from the hash and the sender's private signing key, which is stored in smart card 103. Smart card 103 may then pass the digital signature to smart card reader 104, which may forward it to mobile device 102 via communication link 114 so that mobile device 102 can transmit it along with the e-mail message to the e-mail server. Again, smart card 103 may prevent unauthorized use of the recipient's private signing key by requiring that a password or PIN be supplied before allowing the signing operation to proceed.

The unencrypted session key should be sent securely over communication link 114 from smart card reader 104 to mobile device 102 to prevent a third party from retrieving the session key from communication link 114. Similarly, the hash to be signed should be sent authentically over communication link 114 from smart card reader 104 to mobile device 102 to prevent a third party from modifying the hash and thereby causing smart card 103 to produce a signature using a hash different from the hash of the intended message. Smart card reader 104 and mobile device 102 may each store a common, symmetric key and use a symmetric algorithm to secure communications over communication link 114. Alternatively, smart card reader 104 and mobile device 102 may store their own private keys and each other's public keys, and use an asymmetric algorithm to secure communications over communication link 114.

Headset 106 may communicate with mobile device 102 over wireless communication link 116 and may extend audio functionality of mobile device 102. For example, mobile device 102 may include cellphone functionality, and headset 106 may provide mobile device 102 with audio input and output functions, enabling a user to listen to voice mail, handle voice calls and issue voice commands to mobile device 102. In another example, mobile device 102 may include audio playback functionality, for example an MP3 (moving picture experts group layer 3 audio) playback functionality, and headset 106 may provide device 102 with an audio output function, enabling a user to listen to audio playback.

Mobile device 102 may include data functionality, for example, e-mail functionality. Mobile device 102 may be able to send data over wireless communication link 118 to be printed by wireless printer 108.

Wireless communication links 114, 116 and 118 may be vulnerable to eavesdropping. However, mobile device 102 may be close physically to one or more of devices 104, 106 and even 108. Thus, device 102 may be able to communicate with devices that are nearby at lower powers than with devices that are farther away.

Figure 2:
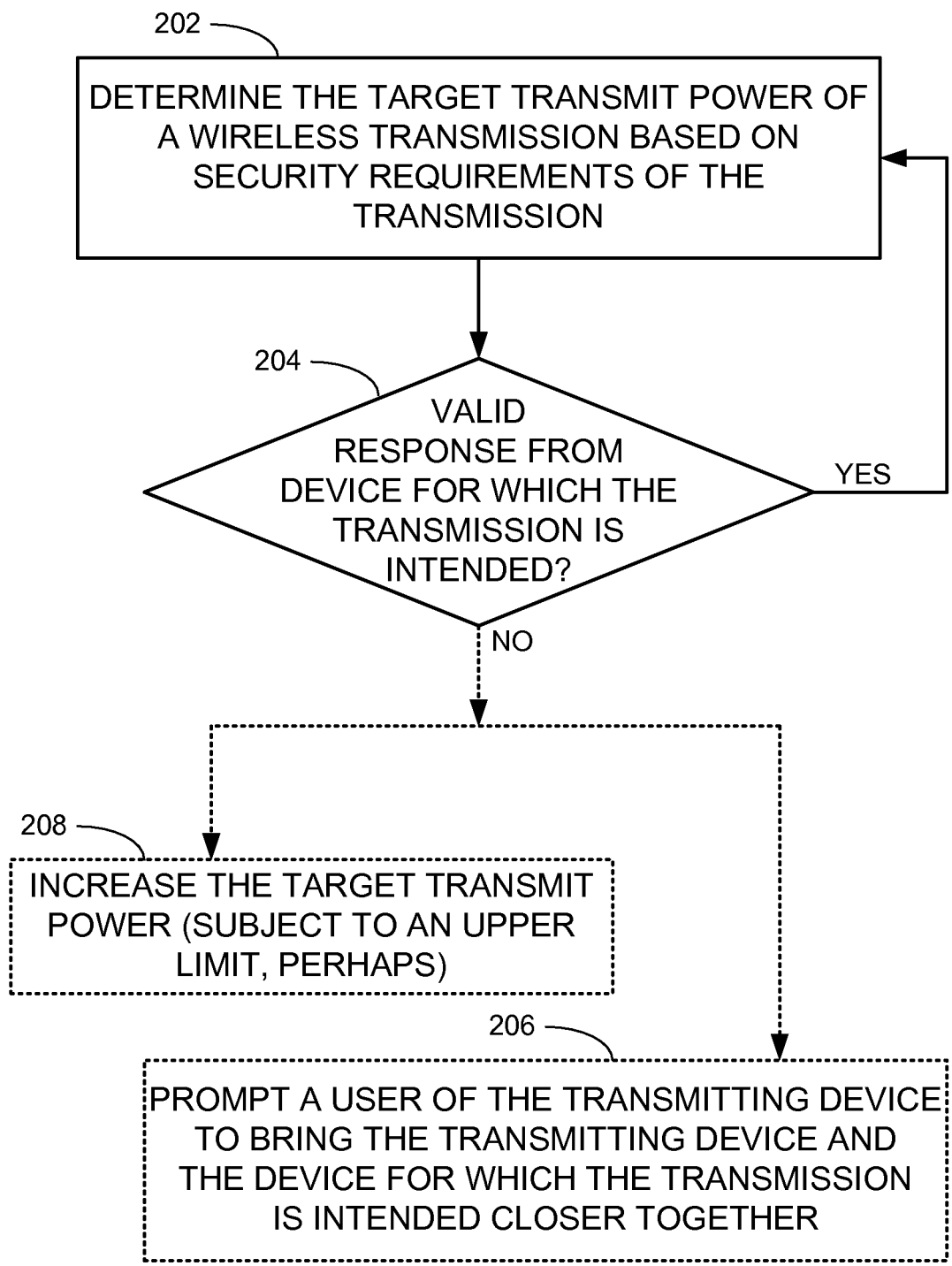

FIG. 2 is a flowchart of a method to be implemented by one or more of devices 102, 104 and 106, according to some embodiments of the invention. At 202, one or more of devices 102, 104 and 106 may determine different target transmit powers for different wireless transmissions having different security requirements. The stricter the security requirements, the lower the target transmit power, so that sensitive transmissions are "whispered" and therefore less vulnerable to eavesdropping. The actual transmit power of a wireless transmission, measured at the antenna of the transmitting device, may differ from the target transmit power due to various factors.

The security requirements of a particular transmission may include a predetermined or dynamically determined security ranking of the device to which one or more frames carried by the particular transmission are addressed, with a lower target transmit power for transmissions carrying frames addressed to devices at higher security rankings than for transmission carrying frames addressed to devices at lower security rankings.

For example, since communications between mobile device 102 and smart card reader 104 may be generally more confidential than communications between mobile device 102 and headset 106, mobile device 102 may determine a lower target transmit power for transmissions intended for smart card reader 104 than for transmissions intended for headset 106. However, the security ranking of a device may be dependent on other factors. For example, the security ranking of smart card reader 104 may be lower while the user is at an authorized workplace than while the user is located outside the authorized workplace. At the authorized workplace, mobile device 102 may determine a relatively high target transmit power for transmissions intended for smart card reader 104 so as to avoid retries due to lack of reception by smart card reader 104 of those transmissions.

In another example, if the sender of a transmission recognizes that there are other transmitters in the area (for example, other active Bluetooth® radios), the sender may reduce the target transmit power of the transmission to make it harder for the other transmitters to receive the transmission. This is analogous to "whispering" when someone is standing nearby.

The security requirements of a particular transmission may include the confidentiality of data carried by the particular transmission, with lower target transmit powers for transmissions carrying data of higher confidentiality than for transmissions carrying data of lower confidentiality.

For example, telephone calls with members of the user's family may be considered less confidential than telephone calls with the user's co-workers. Accordingly, the target transmission power for transmissions between mobile device 102 and headset 106 may be lower for some telephone calls than for others.

In another example, documents may have different confidentiality rankings. The target transmission power for transmitting documents from mobile device 102 to printer 108 may vary according to the confidentiality ranking of the document.

In yet another example, as explained hereinabove, to add a digital signature to an e-mail message being sent by mobile device 102, mobile device 102 may send a hash of the contents of the e-mail message to smart card reader 104. Smart card reader 104 may pass the hash to smart card 103, which may produce a digital signature from the hash and the sender's private signing key, which is stored in smart card 103. Smart card 103 may prevent unauthorized use of the recipient's private signing key by requiring that a password or PIN be supplied before allowing the signing operation to proceed. Since the password or PIN is more confidential than the hash of the contents of the e-mail message, mobile device 102 may determine a lower target transmit power for the transmission carrying the password or PIN than for the transmission carrying the hash of the contents of the e-mail message.

If mobile device 102 does not detect a valid response from the device for which the transmission is intended (checked at 204), mobile device 102 may act according to a security policy. For example, at 206, mobile device 102 may prompt the user to bring mobile device 102 and the device for which the transmission is intended closer together. In another example, at 208, mobile device 102 may increase the target transmit power for transmissions intended for that device, possibly subject to an upper limit.

Figure 3:
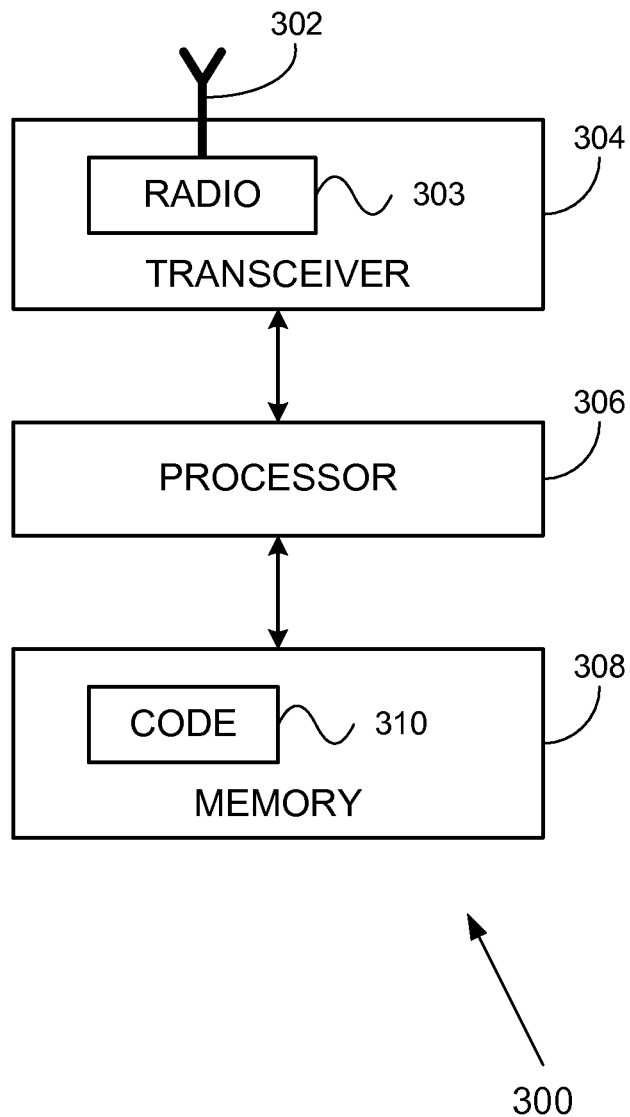
FIG. 3 is a block diagram of one of the devices in the system of FIG. 1, according to some embodiments of the invention.

FIG. 3 is a block diagram of a device 300, according to some embodiments of the invention. Device 300 may be, for example, mobile device 102, smart card reader 104, or headset 106. For clarity, some components of device 300 are not shown in FIG. 3 and are not described explicitly below.

Device 300 includes an antenna 302. A non-exhaustive list of examples for antenna 302 includes a dipole antenna, a monopole antenna, a multilayer ceramic antenna, a planar inverted-F antenna, a loop antenna, a shot antenna, a dual antenna, an omnidirectional antenna and any other suitable antenna.

Device 300 also includes a wireless transceiver 304 including a radio 303 coupled to antenna 302. Wireless transceiver 304 includes both transmitter and receiver functionality. A non-exhaustive list of examples for standards with which wireless transceiver 304 may be compatible includes 802.11 a, b, g and n and future related standards, the Bluetooth® standard, the Zigbee™ standard and the like.

Device 300 also includes a processor 306 coupled to transceiver 304. Device 300 also includes a memory 308, which may be fixed in or removable from device 300. Memory 308 may be coupled to processor 306 or partly embedded in processor 306. Transceiver 304 and processor 306 may be part of the same integrated circuit or in separate integrated circuits. Similarly, processor 306 and memory 308 may be part of the same integrated circuit or in separate integrated circuits.

A non-exhaustive list of examples for processor 306 includes a central processing unit (CPU), a digital signal processor (DSP), a reduced instruction set computer (RISC), a complex instruction set computer (CISC) and the like. Furthermore, processor 306 may be part of an application specific integrated circuit (ASIC) or may be a part of an application specific standard product (ASSP).

A non-exhaustive list of examples for memory 308 includes any combination of the following:
a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
b) optical devices, such as compact disk read only memory (CD ROM), and the like; and
c) magnetic devices, such as a hard disk, a floppy disk, a magnetic tape, and the like.

Memory 308 may store executable code 310 which, when executed by processor 306, determines different target transmit powers for different transmissions to be transmitted by transceiver 306 and having different security requirements.

Executable code 310, when executed by processor 306, may cause device 300 to implement the method of FIG. 2.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method in a first wireless device, the method comprising:
   determining a target transmit power of a wireless transmission, wherein one or more frames to be carried by said wireless transmission are addressed to a second wireless device and include voice data of a telephone call, said target transmit power determined based, at least in part, on confidentiality of said voice data of said telephone call, said confidentiality depending on an identity of a participant in said telephone call who is not using said first wireless device or said second wireless device; and
   transmitting said wireless transmission to said second wireless device.

2. The method of claim 1, wherein said first wireless device comprises a mobile device and said second wireless device comprises a headset.

3. The method of claim 1, wherein said wireless transmission is compatible with a Bluetooth standard.

4. A first wireless device comprising:
   a processor;
   a memory to store executable code which, when executed by said processor, determines a target transmit power of a wireless transmission, wherein one or more frames to be carried by said wireless transmission are addressed to a second wireless device and include voice data of a telephone call, said target transmit power determined based, at least in part, on confidentiality of said voice data of said telephone call, said confidentiality depending on an identity of a participant in said telephone call who is not using said first wireless device or said second wireless device; and
   a wireless transmitter to transmit said wireless transmission to said second wireless device.

5. The first wireless device of claim 4, wherein said wireless transmitter is compatible with a Bluetooth standard.

6. The first wireless device of claim 4, wherein said first wireless device comprises a mobile device and said second wireless device comprises a headset.

7. A non-transitory computer-readable medium having computer-executable instructions which, when executed by a processor of a first wireless device, result in:
   determining a target transmit power of a wireless transmission, wherein one or more frames to be carried by said wireless transmission are addressed to a second wireless device and include voice data of a telephone call, said target transmit power determined based, at least in part, on confidentiality of said voice data of said telephone call, said confidentiality depending on an identity of a participant in said telephone call who is not using said first wireless device or said second wireless device.

8. The non-transitory computer-readable medium of claim 7, wherein said first wireless device comprises a mobile device and said second wireless device comprises a headset.

9. The non-transitory computer-readable medium of claim 7, wherein said wireless transmission is compatible with a Bluetooth standard.

* * * * *